United States Patent [19]

Imai et al.

[11] Patent Number: 5,225,898

[45] Date of Patent: Jul. 6, 1993

[54] NOISE REDUCTION APPARATUS FOR TELEVISION RECEIVER

[75] Inventors: Kiyoshi Imai; Masaaki Fujita; Atsushi Ishizu, all of Osaka, Japan

[73] Assignee: Matsushita Electric Industrial Co., Ltd., Osaka, Japan

[21] Appl. No.: 692,465

[22] Filed: Apr. 22, 1991

[30] Foreign Application Priority Data

Apr. 20, 1990 [JP]  Japan .................................. 2-106192

[51] Int. Cl.$^5$ ......................... H04N 5/213; H04N 9/64
[52] U.S. Cl. ...................................... 358/36; 358/167; 358/105; 358/166; 358/37
[58] Field of Search .................... 358/36, 37, 167, 166, 358/105, 174, 177

[56] References Cited

U.S. PATENT DOCUMENTS 4,794,454  12/1988  Sugiyama ............................ 358/105
4,811,092  3/1989  Achiha ................................. 358/105

OTHER PUBLICATIONS

"LSIs for Improved NTSC Receiver" by K. Imai et al; Meeting of Japanese Television Society, 1988.
"5-3 Noise Reducer" by H. Takahashi; Journal of Japanese Television Society; vol. 33, No. 4, 1979.
"Digital Signal Processing for Improved NTSC Television Receiver" by A. Ishizu et al; IEEE Transactions on Consumer Electronics, vol. 35, No. 3, Aug. 1989.

*Primary Examiner*—James J. Groody
*Assistant Examiner*—Sherrie Hsia
*Attorney, Agent, or Firm*—Pollock, VandeSande & Priddy

[57] ABSTRACT

A noise reduction apparatus for use in a television receiver or VCR using the NTSC format, in which a video signal or a demodulated color difference signal is processed by an operational circuit which supplies a noise-reduced output signal to a first one of two series-connected one-frame delay elements and which compares the input video signal with an output signal from the first 1-frame delay element, to execute noise reduction. A degree of noise reduction executed by the operational circuit is controlled in accordance with the degree of correlation between the output signal from the second 1-frame delay element and the input video signal, such that the degree of noise reduction is made small or zero when the correlation is below a predetermined level, indicating the presence of motion components in the video signal. Due to the 2-frame delay used in judging that degree of correlation, the judgement will not be adversely affected by interference components of the video signal which result from interaction between the chroma and high-frequency luminance components of the video signal, when there are no motion components in that signal.

14 Claims, 4 Drawing Sheets

NOISE REDUCTION APPARATUS FOR TELEVISION RECEIVER

BACKGROUND OF THE INVENTION

1. Field of the Invention

The present invention relates to a noise reduction apparatus for removing white noise contained in a composite video signal, incorporating frame memories, for use in a television receiver or video cassette recorder which employs digital processing of luminance and color signals, and in particular to a noise reduction apparatus for operating on an NTSC format composite video signal.

2. Description of Related Art

In recent years, various types of noise reduction apparatus utilizing frame memories have begun to be incorporated into high definition or improved definition types of digital operation television receiver, and in particular into television receivers which use the IDTV (Improved Definition Television) system for the NTSC format. Generally, such a television receiver is provided with a 3-dimensional Y/C separator circuit or a line-sequential scanning conversion circuit, utilizing one or more frame memories. In addition, types of noise reduction circuits have been proposed for such a television receiver which are based on correlation between the video signal in successive frames, using a frame memory as a delay element. The operation of such a noise reduction circuit is basically intended to reduce noise contained in those portions of the video signal which do not correspond to moving image regions, i.e. the portions of the video signal which should ideally be perfectly correlated between successive frames. Such a noise reduction circuit functions by producing a noise-reduced video signal in which amounts of change (e.g. for each pixel) occurring between successive frames are reduced from those which occur in the input video signal. Such a noise reduction circuit will therefore provide incorrect operation if it acts on portions of the input video signal which actually represent moving image regions, and will result in unwanted residual image regions appearing in the finally obtained display picture.

It is therefore desirable to control such a noise reduction circuit to provide a maximum degree of noise reduction when the input video signal corresponds to static image regions, and to provide zero or a very low degree of noise reduction when the video signal represents a moving region. With one prior art noise reduction apparatus, manual control of the degree of noise reduction produced by such a noise reduction circuit is provided, i.e. the user can adjust the degree of noise reduction while observing the resultant displayed picture, to effect a visually satisfactory result. With another prior art method, as described in detail hereinafter, the degree of noise reduction is made to vary automatically by establishing a non-linear relationship between that degree and the degree of correlation between successive frames of the input video signal, such that if there is a very low degree of correlation, it is judged as resulting from motion components in the video signal, so that the noise reduction circuit is made inoperative. However, that method has format disadvantage, in the case of a television format such as format NTSC format in which the chroma subcarrier is phase-inverted in successive frames, that color interference components of static image regions (sometimes called "cross-color" interference, resulting from interaction between the chroma signal and high-frequency components of the luminance signal in a composite video signal) will be incorrectly judged as representing motion components in the input video signal, so that the effectiveness of the noise reduction circuit will be low.

SUMMARY OF THE INVENTION

It is therefore an objective of the present invention to overcome such prior art problems by providing a noise reduction apparatus whereby operation of a noise reduction circuit will be automatically controlled in accordance with the level of motion components contained in an input video signal, and effective noise reduction will be achieved for static image regions, including reduction of the effects of cross-color interference components in such static image regions.

To achieve that objective, basically, a noise reduction apparatus according to the present invention includes a noise reduction circuit employing two frame memories to provide a delay equal to two frame intervals to detect the degree of correlation between a video signal and that video signal delayed by two frame intervals. A signal obtained based on that degree of correlation is applied to control the degree of noise reduction provided by a noise reduction circuit which operates on the video signal, to thereby obtain a noise-reduced video signal. In that way interference components (e.g. cross-color components) in the video signal which result from interaction between the chroma signal and high-frequency luminance signal components, in those portions of the video signal corresponding to static image regions, can be reduced by the action of that noise reduction circuit. In addition, automatic control of the degree of noise reduction of the noise reduction circuit itself is not adversely affected by the presence of such interference components.

It is a further advantage of the present invention that although two frame memories are utilized in such a noise reduction circuit, it is possible for one of these frame memories to be selectively utilized independently of the noise reduction circuit for some other special function of the television receiver, when required.

More specifically, according to a first aspect, the present invention provides a noise reduction apparatus for a television receiver, for processing an input video signal, comprising:

operational circuit means coupled to receive and operate on said input video signal to produce a noise-reduced output video signal;

first 1-frame delay means for providing a delay of one frame interval of said video signal, coupled to receive said noise-reduced output video signal, and to supply an output signal to said operational circuit means, to be operated on by said operational circuit means;

second 1-frame delay means for providing a delay of one frame interval of said video signal, and coupled to receive an output signal produced from said first 1-frame delay means; and gain adjustment means including means for deriving a signal that is a difference between said input video signal and an output signal produced from said second 1-frame delay means, and means for operating on said difference signal to produce a gain adjustment signal for controlling a degree of noise reduction executed by said operational circuit means.

According to a second aspect, such an apparatus moreover comprises:

a first input terminal coupled to receive an externally produced changeover control signal;

changeover gate means controllable for selectively enabling and inhibiting transfer of said gain adjustment signal to said operational circuit, in accordance with said changeover control signal being in a first and a second state, respectively, said operational circuit being configured to be inoperative when transfer of said gain adjustment signal is inhibited:

a second input terminal and an output terminal respectively coupled to an external circuit, said output terminal being coupled to an output terminal of said second 1-frame delay means; and changeover switch means coupled between said first and second 1-frame delay means, responsive to said changeover control signal for connecting said output signal from the first 1-frame delay means to the input of said second 1-frame delay means when said changeover control signal is at said first state, and for connecting said second output terminal to said input of the second 1-frame delay means when said changeover control signal is at said second state.

According to a third aspect, such an apparatus further comprises changeover control circuit means for transferring said changeover control signal to said changeover gate means, for operating on said changeover control signal to prevent interference with operation of said operational circuit during changes in state of said control signal.

According to a fourth aspect, the present invention provides a noise reduction apparatus for a television receiver, for processing an input composite video signal, comprising:

first 1-frame delay means coupled to receive said composite video signal as an input signal and to produce a delay equal to one frame interval of said composite video signal;

noise detection circuit means for comparing input and output signals of said first 1-frame delay means to detect a level of noise contained in said composite video signal and produce an output signal indicative of said noise level;

demodulation circuit means for deriving an input color-difference signal from said input composite video signal;

operational circuit means coupled to receive and operate on said input color difference signal to produce a noise-reduced color-difference signal;

second 1-frame delay means for providing a delay of one frame interval of said composite video signal, coupled to receive said noise-reduced color-difference signal and to supply an output signal to said operational circuit means to be operated on by said operational circuit means;

third 1-frame delay means for providing a delay of one frame interval of said composite video signal, and coupled to receive an output signal produced from said second 1-frame delay means;

gain adjustment means including means for deriving a signal that is a difference between said input color-difference signal and an output signal produced from said third 1-frame delay means, and means or operating on said difference signal to produce a gain adjustment signal for controlling a degree of noise reduction executed by said operational circuit means, wherein said degree of noise reduction is reduced to zero when said difference signal increases in value above a predetermined threshold value, and wherein said degree of noise reduction is increased in accordance with amounts of reduction of said difference signal value below said threshold value; and circuit means coupled to receive said noise detection circuit output signal for modifying said gain adjustment signal in accordance with a value of said output signal.

According to a fifth aspect, the present invention provides a noise reduction and motion detection apparatus for a television receiver, for processing an input composite video signal, comprising:

first operational circuit means for operating on said composite video signal to produce a noise-reduced luminance signal;

first 1-frame delay means coupled to receive said noise-reduced luminance signal as an input signal, and to produce a delay equal to one frame interval of said composite video signal, to supply an output signal to said first operational circuit means;

first gain adjustment circuit means including means for deriving a signal that is a difference between said input composite video signal and said output signal produced from the first 1-frame delay means, and means for operating on said difference signal to produce a gain adjustment signal for controlling a degree of noise reduction executed by said first operational circuit means a first subtracter for deriving a first motion detection signal as a difference between said output signal from the first 1-frame delay means and said noise-reduced luminance signal;

demodulation circuit means for deriving an input color-difference signal from said input composite video signal;

second operational circuit means coupled to receive said input color-difference signal, for operating thereon to produce a noise reduced color-difference signal;

second 1-frame delay means for providing a delay of one frame interval of said composite video signal, coupled to receive said noise-reduced color-difference signal and to supply an output signal to be operated on by said second operational circuit means;

third 1-frame delay means for providing a delay of one frame interval of said composite video signal, and coupled to receive an output signal produced from said second 1-frame delay means;

second gain adjustment means including means for deriving a signal that is a difference between said input color-difference signal and an output signal produced from said third 1-frame delay means, and means for operating on said difference signal to produce a gain adjustment signal for controlling a degree of noise reduction executed by said first operational circuit means;

a second subtracter for deriving a second motion detection signal as a difference between said output signal from the third 1-frame delay means and said noise-reduced color-difference signal; and motion detection circuit means for operating on said first motion detection signal and second motion detection signal to derive a value of a motion factor.

DESCRIPTION OF PREFERRED EMBODIMENTS

Before describing embodiments of the present invention, a related prior art noise reduction apparatus will be discussed. This is for use in an IDTV system having a frame-recirculation type of noise reduction apparatus, which is described in "LSIs for Improved NTSC Receiver" by Kiyoshi Imai et al, in a 1988 Convention paper of the Society of Television Engineers (Japan).

Figure 1:
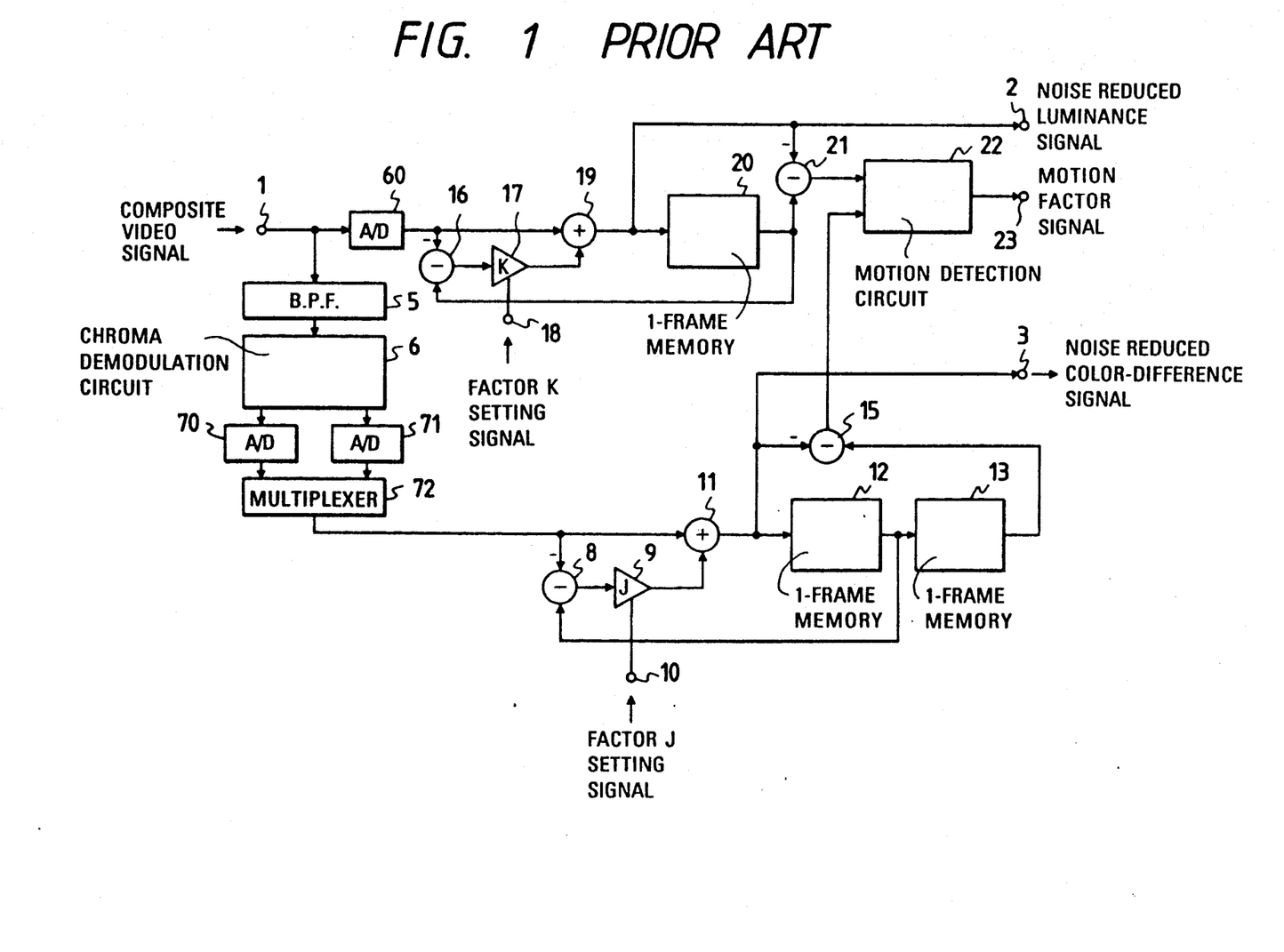
FIG. 1 is a block diagram of an example of a prior art noise reduction apparatus.

That prior art noise reduction apparatus will be described referring to the block diagram of FIG. 1 of the drawings. In FIG. 1, numeral 1 denotes an input terminal to which is applied an analog composite video signal, which is converted to a digital signal by an A/D (analog-to-digital) converter 60, and is also supplied via a band-pass filter 5 (for separating the chroma component of the composite video signal) to a color demodulation circuit 6 in which the chroma component is demodulated to obtain two demodulated color-difference signals which are supplied to respective A/D converters 70, 71. The resultant digital color-difference signals are then combined by a multiplexer 72 to obtain multiplexed demodulated digital color-difference signals (referred to in the following simply as the color difference signal). Numeral 2 denotes an output terminal from which is outputted a noise reduced luminance signal, 3 denotes an output terminal from which is outputted a noise-reduced color difference signal, and 23 denotes an output terminal from which is outputted a signal representing the value of motion factor of the input composite video signal for use in controlling a motion-adaptive type of Y/C separator or a motion-adaptive type of line-sequential scanning converter. 8 denotes a subtracter, 9 a multiplier for multiplying the output signal from the subtractor 8 by a factor J, 10 a factor setting input terminal to which is applied an input signal for setting the value of the factor J, and 11 an adder for obtaining the sum of the output signals from the subtractor 8 and the factor multiplier 9. 12 and 13 denote respective 1-frame memories, each having a memory capacity capable of storing the color difference signal, and 15 denotes a subtractor for subtracting the input signal to the 1-frame memory 12 from the output signal of the 1-frame memory 13.

Numeral 16 denotes a subtracter, 17 denotes a multiplier for multiplying the output signal from the subtractor 16 by a factor K, 18 denotes a factor setting input terminal to which is applied an input signal for setting the value of the factor K, and 19 denotes an adder for obtaining the sum of the composite video signal supplied from input terminal 1 via the A/D converter 60 and the output signal of the factor multiplier 17.

Numeral 20 denotes a -frame memory, 21 denotes a subtracter, and 22 denotes a motion detection circuit. The input signal to the 1-frame memory 20, which is the output signal from the adder 19, is subtracted from the output signal of the 1-frame memory 20 by the subtractor 21, which thereby produces a motion detection Signal that is applied to one input of the motion detection circuit 22. The output signal from the subtractor 15 is applied as the other motion detection input signal of the motion detection circuit 22. The motion detection circuit 22 processes these motion detection signals to obtain a value of motion factor, which is supplied to the output terminal 23.

The operation of this prior art noise reduction apparatus is as follows. The portions of the circuit concerned with noise reduction of the luminance signal will first be described. The subtractor 16, factor multiplier 17 and adder 19 constitute a luminance signal noise reduction circuit, in conjunction with the 1-frame memory 20. The gain of the noise reduction operation is determined by the K factor setting signal that is applied to the input terminal 18. The K and J factor setting signals are generated by manually operable means (not shown in the drawings). In practice, the user adjusts the level of these factor setting signal while observing a displayed television picture that is being produced as a result of processing by the noise reduction apparatus, i.e. the user adjusts the K factor and J setting signals until satisfactory noise reduction is achieved, as judged by observing a displayed picture. If the value of the factor K is made 0, then the level of the output signal from the factor multiplier 17 will be 0, and hence the level of the output signal from the adder 19 (and so from the luminance signal output terminal 2) will be identical to that of the input composite video signal (from the A/D converter 60), i e. the degree of noise reduction will be zero. Such a condition will be referred to as a "noise reduction gain" of zero. If the value of the factor K is made $\frac{1}{2}$, then the level of the output signal from the adder 19 will be the average of the levels of the output signals from the 1-frame memory 20 and the input composite video signal (from the A/D converter 60). In that case, components which do not exhibit inter-frame correlation i.e. noise components, in the case of a static image) will be reduced by $\frac{1}{2}$, while signal components which do exhibit inter-frame correlation will be left unchanged, i.e. in this case there is a "noise reduction gain" of $\frac{1}{2}$. Thus by adjusting the value of the factor K in the range between 0 and $\frac{1}{2}$, by adjusting the factor K setting signal that is applied to the input terminal 18, a desired degree of noise reduction can be selected.

The operation of the color-difference signal noise reduction circuit is similar to that of the luminance signal noise reduction circuit described above. The subtracter 8, factor multiplier 9 and adder 11 constitute a color-difference signal noise reduction circuit in conjunction with the 1-frame memory 12. In this case the gain of the noise reduction is determined by the factor J setting signal that is applied to the setting signal input terminal 10. A noise-reduced luminance signal is thus supplied to the output terminal 2, and a noise-reduced color-difference signal to the output terminal 3. The output signals from the output terminals 2 and 3 are inputted to an external circuit such as a motion-adaptive Y/C separator circuit (not shown in the drawing), which is controlled based on the motion factor signal produced from the motion detection circuit 22. In the case of the low-frequency components of the luminance signal, the motion detection operation of the motion detection circuit 22 is based on judging the correlation between the input and output signals of the 1-frame memory 20. That is to say, the low-frequency components of the output signal from the subtracter 21 are utilized in that judgement, so that if there is high inter-frame correlation of these low-frequency components, there will be a low-amplitude output signal from the subtractor 21; whereas if there is low inter-frame correlation, that output signal amplitude will be high. However, the high-frequency components of the luminance signal (i.e. components of 2.5 MHz or higher) are affected by interaction with the carrier chroma signal in the input composite video signal. Since with the NTSC format the phase of the chroma subcarrier is inverted in alternate frames, high-frequency interference components resulting from such interaction will also be similarly phase-inverted, and hence will be outputted from the subtracter 21, even when the video signal corresponds to a static image region. Thus it is not possible to use the high-frequency components of the output signal from the subtractor 21 for motion detection. Such interference components will be transferred to the demodulated color difference signal, as "cross-color" components. However, since there is a delay difference of two frame intervals between the two input signals of the subtractor 15, and since the cross-color components also are phase-inverted in successive frames, the cross-color components will not be present in the output signal from the subtractor 15 so long as that signal represents a static image region. Only when there is image motion, will the high-frequency components of the luminance signal that result from the image motion be present in the demodulated color-difference signal, in the form of cross-color components which do not exhibit correlation between each $n^{th}$ frame and $(n-2)^{th}$ frame. Thus the output signal from the subtractor 15 represents high-frequency components of the luminance signal that result from image motion, and so is supplied as a second motion detection signal to the motion detection circuit 22. In this way the motion detection circuit 22 can derive a value of motion factor that is accurately based on a degree of frame correlation of both high-frequency and low-frequency components of the luminance signal.

However, such a prior art noise reduction apparatus has basic disadvantages, i.e. that it is necessary to manually adjust the J and K factor setting signals, so that the operation of the noise reduction circuit is not automatically and immediately varied in accordance with changes of the video signal between representing static image regions and moving regions.

There is a prior art example of a noise reduction apparatus for a television receiver in which these multiplier factors are automatically adjusted in units of pixels, in accordance with inter-frame correlation, as described in an article entitled "Noise Reducer" by Hiroshi Takahashi in the Bulletin of Society of Television Engineers (Japan) Vol. 33, No. 4 (1979). However, with that apparatus, only the inter-frame correlation of an input composite video signal is detected (i.e. correlation between each frame and the succeeding frame). The result thus detected is then used to control the degree of noise reduction provided by a noise reduction circuit in a non-linear manner, such that if there is a very low degree of correlation (which is judged as being probably due to motion components rather than to noise), the noise reduction circuit is made inoperative. However, with an NTSC video signal as described above, even when the video signal represents a static image region, interference components are contained in that signal which result from interaction between the chroma signal and high-frequency components of the luminance signal, and these interaction components are phase-inverted in successive frames. Thus with such a prior art apparatus, such components will be detected as if they represented image motion components, and hence the noise reduction circuit will be made inoperative or will not operate in a satisfactory manner. It is therefore a basic objective of the present invention to provide a noise reduction apparatus in which the degree of noise reduction circuit can be automatically adjusted while overcoming this problem, so that cross-color components will not be erroneously detected as motion components, but moreover will be eliminated by an noise reduction circuit.

Recently developed types of television receiver, such as a receiver having an IDTV (improved definition television) system, include additional functions such as for providing a simultaneous 2-picture display, which require the use of one or more frame memories. However such a special function is not used on a continuous basis. It is therefore another objective of the present invention to provide an improvement over the prior art by providing a television receiver in which such a special function can temporarily utilize a frame memory that is normally utilized in a noise reduction circuit. A noise reduction apparatus can thereby be added to a prior art digital television receiver without a significant increase in manufacturing cost.

It is a further objective of the present invention to provide a noise reduction apparatus in which a frame memory (or a pair of frame memories connected in series), used for frame correlation detection to derive a signal for controlling the degree of noise reduction provided by a noise reduction circuit, is also simultaneously used to produce a motion detection signal, for deriving a value of motion factor that is required by subsequent circuits of the television receiver, such as a motion-adaptive Y/C separator circuit. Reduced circuit scale can thereby be achieved.

Figure 2:
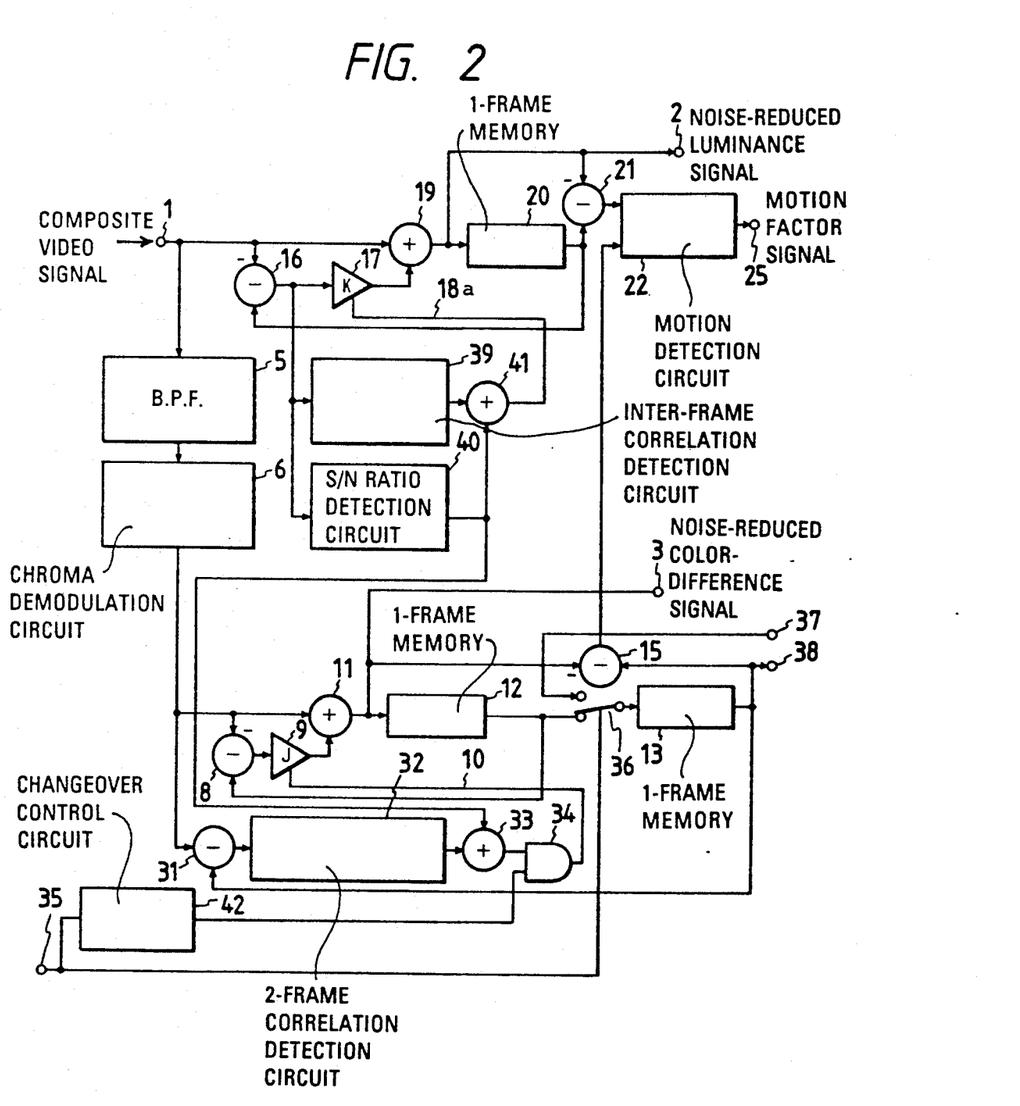
FIG. 2 is a block diagram of a first embodiment of a noise reduction apparatus according to the present invention.

A first embodiment of a noise reduction apparatus according to the present invention will be described referring to the block diagram of FIG. 2. In FIG. 2, components corresponding to those of the prior art noise reduction apparatus of FIG. 1 described hereinabove are designated by identical reference numerals, and detailed description will be omitted. The circuit formed by the subtracter 16, factor multiplier 17, and adder 19 will be referred to as the first operational circuit, which functions in conjunction with the 1-frame memory 20 as a luminance signal noise reduction circuit, and whose output signal (produced from the adder 19) will be referred to as the noise-reduced luminance signal. A signal that is the difference between the input and output signals of the 1-frame memory 20, derived by the subtractor 21, is inputted to the motion detection circuit 22 as a first motion detection signal indicating a degree of inter-frame correlation of low-frequency components of the luminance signal. The subtractor 8, factor multiplier 9 and adder 11 will be referred to as a second operational circuit, which operates in conjunction with the frame memories 12 and 13 (when these are connected in series) as a color-difference signal noise reduction circuit, and which executes noise reduction processing of the color-difference signal (i.e. multiplexed color-difference signals) produced from the chroma demodulation circuit 6 to produce a noise-reduced color-difference signal from the adder 11 that is supplied to the output terminal 3. A signal that is the difference between the input signal of the 1-frame memory 12 and the output signal of the 1-frame memory 13, derived by the subtractor 15, is inputted to the motion detection circuit 22 as a second motion detection signal, expressing a degree of correlation between each $n^{th}$ frame and $(n-2)^{th}$ frame A S/N ratio detection circuit 40, coupled to receive the difference output signal from the subtractor 16, supplies an output signal in common to one input of each of the adders 33 and 41, which varies in accordance with the signal noise ratio of the input composite video signal.

The frame correlation detection circuit 39 receives the output signal from the subtracter 16, and applies a corresponding output signal to the other input of the adder 41. The output signal produced from the adder 41 is applied to the factor K control lead 18 a of the factor multiplier 17, for determining the value of the factor K. Similarly, the 2-frame correlation detection circuit 32 receives the output signal from the subtracter 31, and applies a corresponding output signal to the other input of the a adder 33. The output signal produced from the adder 33 is applied to the factor J control lead 10 of the factor multiplier 9 (through an AND gate 34, which that gate is enabled), for determining the value of the factor J.

It will be understood that the digital signals in the apparatus of FIG. 2 are processed as successive sets of parallel bits, so that although the AND age 4 is shown for simplicity as a single gate which produces a single output signal, that would of course in practice consist of a set of gates equal in number to the bits which express successive digital signal values.

35 is an input terminal to which is applied an externally produced changeover signal which is supplied to a changeover control circuit 42 and also is applied as a switch control signal to a changeover switch 36. 37 denotes an input terminal to which is applied an externally produced signal required for the operation of an auxiliary function of the television receiver, as described hereinafter. 38 denotes a corresponding output terminal, coupled to the output of the 1-frame memory 13. A noise-reduced multiplexed color-difference signal (referred to in the following simply as the noise-reduced color difference signal) is produced from the adder 11, as in the example of FIG. 1, and applied to an output terminal 3.

The changeover switch 36 is controlled by the signal applied to input terminal 35, to select either the output signal from the 1-frame memory 12 or the externally supplied signal from the memory input terminal 37, to be inputted to the 1-frame memory 13.

Each of the frame correlation detection circuit 39 and S/N ratio detection circuit 40 is coupled to receive the output difference signal from the subtracter 16. The sum of the output signals from the frame correlation detection circuit 39 and S/N ratio detection circuit 40, produced from the adder 41, sets the value of factor K of the factor multiplier 17.

The output signal from the changeover control circuit 42 selectively enables and inhibits the AND gate 34, in accordance with the externally supplied signal that is applied to the input terminal 35.

The 1-frame memory 20, subtractor 16, frame correlation detection circuit 39, S/N ratio detection circuit 40, and adder 41 constitute a first gain adjustment circuit, for the luminance signal noise reduction circuit. The subtracter 31, 2-frame correlation detection circuit 32, S/N ratio detection circuit 40 and adder 33, in conjunction with the frame memories 12 and 13, constitute a second gain adjustment circuit, for the color-difference signal noise reduction circuit.

Figure 3:
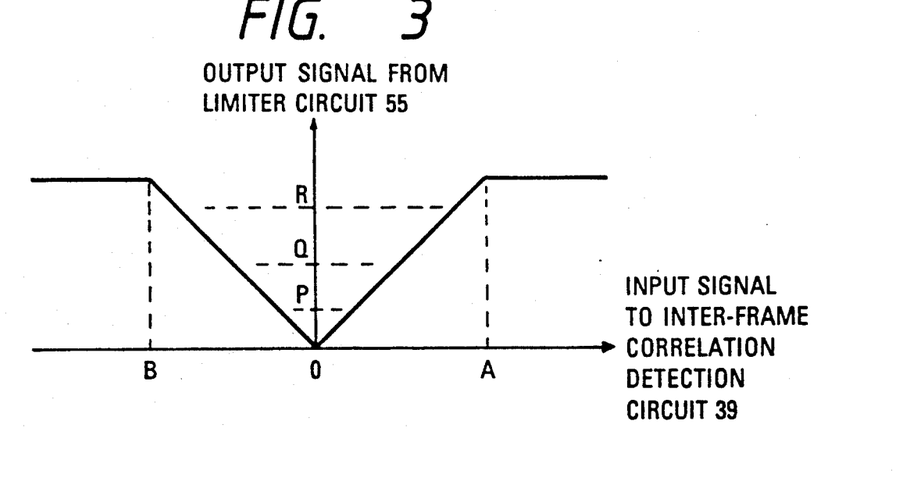
FIG. 3 is a graph for describing the operation of a frame correlation detection circuit in the embodiment of FIG. 2.
Figure 4:
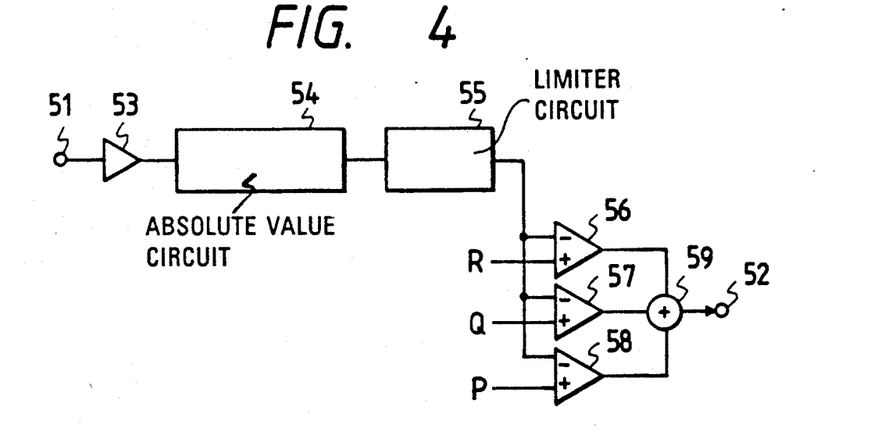
FIG. 4 is a block diagram of a specific configuration for a frame correlation detection circuit in FIG. 2.

The operation will be described referring to FIGS. 3 to 6, in addition to FIG. 2. Firstly, the process will be described whereby the value of the signal applied to the factor setting lead 18 is determined, in accordance with the condition of the input composite video signal that is applied to input terminal 1. The output signal from the subtracter 16, i.e. the difference signal between successive frames of the input composite video signal, is inputted to the factor multiplier 17, frame correlation detection circuit 39 and S/N ratio detection circuit 40 respectively. Basically, the frame correlation detection circuit 39 detects amounts of change in the input composite video signal between successive frames, for thereby executing automatic control such that if the amount of change is large (indicating the presence of motion components) then the factor K of the factor multiplier 17 is made small or zero, whereas if the amount of change is small (indicating that any non correlation is due to noise) then K is set to a large value. The operation of the frame correlation detection circuit 39 will be described referring to FIGS. 3 and 4, in which FIG. 3 is a graph for describing the operation of the frame correlation detection circuit 39 and FIG. 4 shows a specific configuration for the frame correlation detection circuit 39 corresponding to FIG. 3. In FIG. 4, the input signal from the subtracter 16 is multiplied by a fixed factor in a multiplier 53, then the absolute value of the output signal from the multiplier 53 is derived by an absolute value converter circuit 54. The output signal from the circuit 54 is then limited to a predetermined maximum level by a limiter circuit 55, and the output signal from the limiter circuit 55 is applied to one input of each of a set of three comparators 56, 57 and 58. Predetermined threshold values R, Q and P are applied to the other inputs of the comparators 56, 57 and 58 respectively. The output signals from the comparators 56, 57, 58 are summed by an adder 59, whose output signal is supplied to a terminal 52.

In FIG. 3, values of input signal inputted to the frame correlation detection circuit 39 are plotted along the horizontal axis, in a direction in accordance with the polarity of that signal value, while values along the vertical axis represent output signal level from the limiter circuit 55. The greater the degree of inter-frame correlation of the input composite video signal, the smaller will become the input signal value supplied to the frame correlation detection circuit 39, i.e. if there is perfect inter-frame correlation, corresponding to the case of a video signal representing a completely static picture (which is also completely noise-free) then the input signal value to the frame correlation detection circuit 39 will be zero, and in that case the output signal from the frame correlation detection circuit 39 should set the value of the factor K to a maximum. With the circuit of FIG. 4, the output signal from the frame correlation detection circuit 39 sets that maximum value of K if the output signal from the limiter circuit 55 is below the threshold level P. Conversely, if there is low correlation between successive frames of the input composite video signal, then the input signal to the frame correlation detection circuit 39 will take a correspondingly high positive or negative value. If that value exceeds a predetermined threshold level, then that is to be judged as indicating image motion, so that the output signal from the frame correlation detection circuit 39 causes the factor K to be set to zero. In this circuit example, that predetermined threshold level corresponds to is the value R, as shown in FIG. 3. For that reason, the output signal level from the limiter circuit 55 is limited to values which do not significantly exceed that threshold level R i.e. corresponding to the limit points A and B in FIG. 3.

It can thus be understood that with the circuit of FIG. 4, basically, if the degree of inter-frame correlation is lower than a certain level, so that the output signal from the limiter circuit 55 is above the threshold value R, then this is judged as indicating that the very low correlation is a result of image motion. Hence, the output signal from the frame correlation detection circuit 39 sets the factor K to zero, rendering the noise reduction circuit inoperative. If however there is a moderate amount of non-correlation between successive frames, so that the output signal from the limiter circuit 55 is lower than the threshold value R, then this is judged as indicating that the non-correlation is due to noise in the input composite video signal. Hence, the output signal from the frame correlation detection circuit 39 sets the factor K to a value in accordance with the degree of inter-frame correlation.

The relationship between output signal levels from the limiter circuit 55 and the corresponding output values produced from the comparators 56, 57 and 58 and hence from the adder 59, are shown in Table 1 below.

It can thus be understood that when the output signal value from the limiter circuit 55 is small or zero, the output value from the adder 59 will be maximum, while when the output value from the limiter circuit 55 is high, the output value from the adder 59 will be small or zero.

TABLE 1

| Output from limiter circuit 55 | Output from comparator 56 | Output from comparator 57 | Output from comparator 58 | Output from adder 59 |
| --- | --- | --- | --- | --- |
| O to P | 1 | 1 | 1 | 3 |
| P to Q | 1 | 1 | 0 | 2 |
| Q to R | 1 | 0 | 0 | 1 |
| R or higher | 0 | 0 | 0 | 0 |

The control sensitivity of the circuit of FIG. 4 can be adjusted by varying the factor of the multiplier 53, the limit values A, B of the limiter circuit 55, and the threshold values R, Q and P of the comparators 56, 57 and 58. It would be possible to increase the precision of control by increasing the number of comparators used. The output signal from the adder 59 constitutes the output signal from the frame correlation detection circuit 39, and directly corresponds to the output value produced from the adder 41 when the output signal value produced from the S/N ratio detection circuit 40 is zero. The relationships between the output signal values from the frame correlation detection circuit 39 and the resultant values established in the factor multiplier 17 for the factor K are set out in Table 2 below, assuming in each case that the output signal value from the S/N ratio detection circuit 40 is zero.

TABLE 2

| Output value from frame correlation detection circuit 39 | Value of factor K |
| --- | --- |
| 3 | 3/8 |
| 2 | 2/8 |
| 1 | 1/8 |
| 0 | 0 |

Basically, the value of K is determined as shown in Table 2 based on the output value from the frame correlation detection circuit 39. However, when a television receiver operates in a region in which the radio wave field strength is very weak, so that the input composite video signal that is to be processed has a very low S/N ratio, it is necessary to take into consideration the very high noise level in such a case. That is to say, even if the field strength of a broadcast signal is so weak that colors are eliminated from the displayed picture, in many cases the sound quality will be satisfactory, and the user will wish to receive the broadcast. However due to the very high noise level of the input composite video signal, if the noise reduction operation described hereinabove is used unchanged, then it will be judged that there is substantially zero correlation over the entire picture, between successive frames, so that the output signal level from the limiter circuit 55 will be higher than the threshold value R in FIG. 3 during each frame interval. Thus the frame correlation detection circuit 39 will function as if image motion had occurred, so that the output signal value from the frame correlation detection circuit 39 will be zero throughout each frame even if there is no image motion, and so no noise reduction will be achieved.

To overcome this problem, in such a condition, the S/N ratio detection circuit 40 produces an output signal value in response to the high noise level that will be contained in the output signal from the subtractor 16. That output signal value, applied through the adder 41, serves in effect to raise the minimum value of the output from the adder 41 to a value that is greater than zero. In this way, noise reduction can be achieved for the case of an input composite video signal which has low inter-frame correlation due to a high level of noise.

Various possible configurations can be envisaged for the S/N ratio detection circuit 40. In the present embodiment, the operation of the S/N ratio detection circuit 40 is based on the fact that the vertical flyback intervals of the input composite video signal cannot contain image motion components, so that a low level of inter-frame correlation during these intervals can only be caused by noise. Thus, the correlation between successive frames (i..e. the level of the output signal from the subtractor 16) during each vertical flyback interval is detected in the S/N ratio detection circuit 40, to thereby obtain an output signal value representing the S/N ratio of the input composite video signal.

The circuit portion concerned with luminance signal noise reduction has been described above. The portion concerned with noise reduction of the demodulated multiplexed color difference signals outputted from the chroma demodulator circuit 6 (referred to simply as the color difference signal in the following) is as follows, assuming first that the changeover switch 36 is set to supply the output signal from the 1-frame memory to the 1-frame memory 13. The color-difference signal noise reduction circuit, based on the 1-frame memory 12 in conjunction with the subtractor 8, factor multiplier 9 and adder 11, functions in the same way as the luminance signal noise reduction circuit described above. However in the case of detecting frame correlation of a color-difference signal derived from an NTSC video signal, for motion detection, it is necessary to take into account the aforementioned cross-color components that are contained in the color-difference signal. Since these are inverted in phase in successive frames, they would incorrectly be detected as image motion components if frame correlation were to be judged based on a signal obtained by mutually subtracting the input and output signals of a 1-frame memory (e.g. the output signal from the subtracter 16). For that reason, a signal indicating frame correlation, for use in controlling the value of the factor J of the factor multiplier 9, is derived as the difference between the input signal to the 1-frame memory 12 and the output signal from the 1-frame memory 13, obtained from the subtractor 31. Since the cross-color components in the color-difference signal produced from the chroma demodulation circuit 6 and in the output signal from the 1-frame memory 13 will thereby be in phase, they will be eliminated from appearing in the output signal from the subtracter 31. That output signal from the subtracter 31 is supplied to a 2-frame correlation detection circuit 32, which functions in the same way as the frame correlation detection circuit 39 described hereinabove, and can have the same internal configuration as the frame correlation detection circuit 39.

As for the luminance signal noise reduction circuit, the output signal from the S/N ratio detection circuit 40 is added to the output signal from the 2-frame correlation detection circuit 32, in an adder 33, to thereby increase the minimum value of the output signal from the adder 33 when the color-difference signal has a very high noise level, as described hereinabove for the luminance signal noise reduction circuit, to thereby ensure that effective noise reduction will be applied to the color-difference signal when receiving a broadcast television signal in a region of weak field strength.

Rather than using a separate S/N detection circuit for the color-difference signal, the S/N ratio detection circuit 40 is used in common for both the luminance signal and the color-difference signal noise reduction circuits. This serves to reduce the circuit scale required to implement the overall noise reduction apparatus.

A noise-reduced color-difference signal is outputted from the adder 11 and supplied to the output terminal 3, and also to one input of the subtractor 15, while the output from the 1-frame memory 13 is applied to the other input of the subtractor 15, which thereby produces an output signal whose value represents an amount of non-correlation of the color-difference signal between each frame and the last frame but one, i.e. between the $n^{th}$ and the $(n-2)^{th}$ frame, resulting from image motion components. That motion detection signal is applied to one input of the motion detection circuit 22, to be processed in conjunction with the motion detection signal from the subtractor 21, for producing the motion factor output signal that is supplied to output terminal 23.

A feature of the embodiment of FIG. 2 will now be described, whereby the apparatus can be switched to a special operation condition in which one of the two frame memories 12, 13 that are normally used for 2-frame correlation detection as described above during color-difference signal noise reduction and motion detection operation, can be used independently of the color-difference signal noise reduction circuit, for an additional function of the television receiver, such as a function for providing a dual-image display. During that special operation condition, the noise reduction and motion detection processing applied to the luminance signal are continued unchanged, with only the color-difference signal processing being interrupted. To establish that special mode, the externally generated control signal applied to the input terminal 35 is changed to a level whereby the changeover switch 36 is set to transfer an externally supplied signal (relating to the additional television receiver function) from the input terminal 37 to the input of the 1-frame memory 13, so that the 1-frame memory 13 is now connected between the input terminal 37 and output terminal 38 and so can be used as an independent 1-frame memory. The output signal from the 1-frame memory 13 is fixedly supplied to the output terminal 38.

Figure 5:
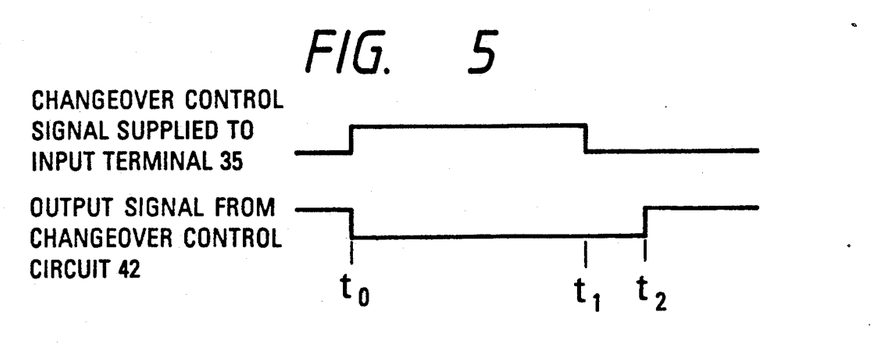
FIG. 5 is a waveform diagram for describing a memory changeover switching operation in the embodiment of FIG. 2.

During operation in that special mode, the output signal from the changeover control circuit 42 is controlled by the signal applied to the input terminal 35 such that the AND gate 34 is inhibited. However, in addition to the above arrangements, it is also necessary to adopt specific measures to prevent interference with the operation of the color-difference signal noise reduction circuit at the time of changeover from the special mode back to the normal mode. These measures will be described referring to the waveform diagram of FIG. 5. When the externally supplied changeover control signal applied to terminal 35 goes from its normal low state to the high state at time $t_0$, the changeover switch 36 is changed over to connect the input terminal 37 to the input of the 1-frame memory 13, instead of the output from the 1-frame memory 12. In addition, the output signal from the changeover control circuit 42 goes to the low level at time $t_0$, to thereby inhibit the AND gate 34. In that condition, the output signal from the AND gate 34 is held at a value of 0, so that no noise reduction operation takes place, since the factor J is fixed at 0, and the 1-frame memory 13 is used in executing the special function. Subsequently, when operation in the special mode is to be terminated, that control signal returns to the low level, at time $t_1$. However, the output signal from the changeover control circuit 42 does not immediately return to the high level at time $t_1$. Instead, the return of that signal to the high level to enable gate 34, occurs at time $t_2$ after a delay interval of $(t_2-t_1)$. This is because it is first necessary to write color-difference signal data into the 1-frame memory 13 to ensure that no disturbance will occur when noise reduction operation again begins. Thus, during the interval $(t_2-t_1)$, output data from the 1-frame memory 12 are written into the 1-frame memory 13. The duration of that interval $(t_2-t_1)$ must be made greater than one frame interval. At time $t_2$, normal color-difference signal noise reduction operation is resumed.

A second embodiment of the present invention will be described referring to the partial block diagram of FIG. 6. This embodiment differs from that FIG. 6 only with regard to the circuit portion which executes noise reduction and motion detection processing of the color-difference signal. For simplicity, only that circuit portion is shown, with circuit components corresponding to those of FIG. 2 being designated by identical reference numerals. The objective of this embodiment is to ensure that the motion detection output signal from the subtractor 15 will be advanced along the time axis by a predetermined amount with respect to the noise-reduced color-difference signal that is supplied to the output terminal 3. This is desirable for the following reasons. There will be a certain amount of delay between the time of input of a signal value from the subtractor 15 to the motion detection circuit 22 until a corresponding output value is produced from the motion detection circuit 22. Thus, the output signal from the subtractor 15 is delayed with respect to the noise-reduced color-difference signal, or even if these signals are mutually synchronized, there will be a time delay applied to the output signal from the motion detection circuit 22 relative to the noise-reduced color-difference signal. As a result, it will be necessary to provide various delay elements within the signal paths of circuits which subsequently process the noise-reduced color-difference signal and the motion detection output signal from terminals 3 and 23 respectively in FIG. 2, in order to compensate for the delay of the output signal from the motion detection circuit 22. This will substantially increase the scale and cost of such circuits.

Figure 6:
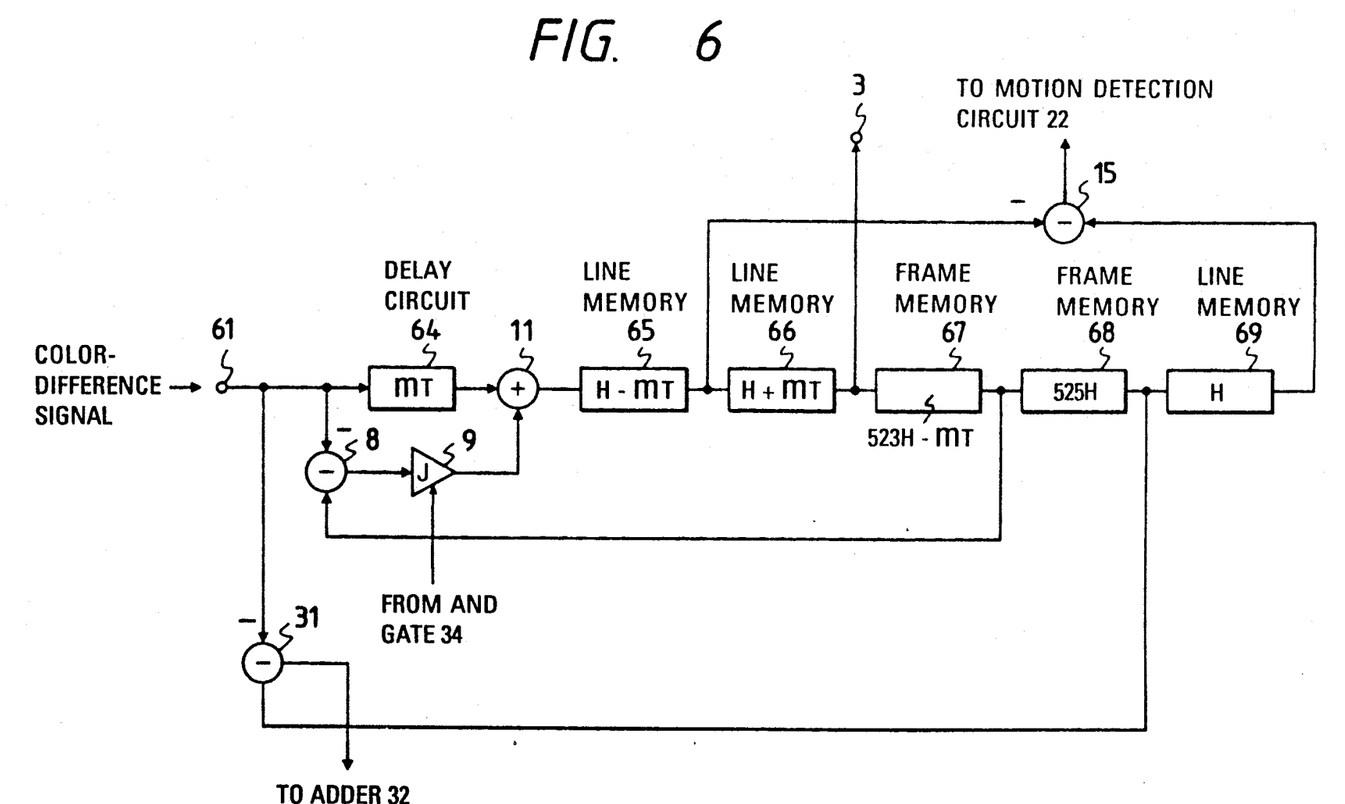
FIG. 6 is a partial block diagram of a second embodiment of the present invention.

The circuit of FIG. 6 basically differs from that of FIG. 2 with regard to the frame memory arrangement that is used for noise reduction processing and frame correlation detection. Numeral 64 denotes a delay circuit providing a delay of mT, where T is the basic clock period of the digital signals in the circuit, i.e. the period of successive digital values, and m is the amount of delay produced in the signal path between the input to the subtractor 8 and the output from the factor multiplier 9. Thus the delay circuit 64 compensates for that delay. 65 and 66 denote respective line memories, which provide respective delays of H−mT and H+mT, where "H" denotes the duration of a horizontal scan interval. A frame memory 67 provides a delay of (523H−mT), while a frame memory 68 provides a delay of 525H, and a line memory 69 provides a delay of H. As shown, the line memories 65, 66, the frame memories 67, 68, and the line memory 69 are successively connected in series. The output signal from the adder 11 is supplied to the input of the line memory 65. The noise-reduced color-difference signal being outputted from the line memory 66 is supplied to output terminal 3. The subtractor 15 obtains the difference signal between the input signal to the frame memory 66 and the output signal from the line memory 69. The output signal from the frame memory 67 is applied to one input of the subtracter 8, and the output signal from the frame memory 68 is applied to one input of the subtractor 31.

The operation of the circuit of FIG. 6 is as follows. As in the embodiment of FIG. 2, the noise reduction processing by the subtractor 8, factor multiplier 9, adder 11 and related circuit elements uses a feedback path with a delay of one frame interval, while the subtracter 31 derives a signal that is the difference between the input color-difference signal (shown as being supplied to an input terminal 61) and that color-difference signal delayed by 2 frame intervals, with that difference signal being applied via the adder 33 to control the value of the factor J of the factor multiplier 9. Also as in FIG. 2, the subtractor 15 derives a signal that is the difference between the noise-reduced color-difference signal (outputted from the line memory 65) and that signal delayed by two frame intervals, with that output signal from the subtracter 15 being supplied to one input of the motion detection circuit 22.

It will be apparent that the output signal supplied from the frame memory 67 to on input of the subtractor 8 is delayed with respect to the signal that is applied to the other input of the subtractor 8 from the input terminal 61 by an amount:

$$(mT)+(H-mT)+(H+mT)+(523H-mT)=525H,$$

i.e. exactly one frame interval.

Similarly, the output signal supplied from the line memory 69 to one input of the subtractor 15 is delayed with respect to the output signal supplied to the other input of the subtractor 15 from the line memory 65, by the amount:

$$(H+mT)+(523H-mT)+(525H)+H=1050H,$$

i.e. exactly two frame intervals.

Moreover, the output signal supplied from the frame memory 68 to one input of the subtractor 31 is delayed with respect to the signal supplied to the other input of the subtracter 31 from the input terminal 61, by the amount:

$$\text{(Delay amount between input signals of the subtractor 8)} +(525H)=1050H,$$

i.e. exactly two frame intervals.

Thus, due to the line memory 65 being inserted between the output of the adder 11 and the corresponding input of the subtractor 15, the output signal from the subtractor 15 is advanced along the time axis with respect to the noise-reduced color-difference signal that is supplied to output terminal 3. That is to say, the output signal from terminal 3 is delayed with respect to the input color-difference signal from input terminal 61 by the amount:

$$(mT)+(H-mT)+(H+mT)=2H+mT,$$

whereas the output signal from the subtractor 15 is delayed with respect to the input signal from terminal 61 by the amount:

$$(mT)+(H-mT)=H$$

Thus the output signal from the subtracter 15 is time-advanced with respect to the noise-reduced color-difference signal supplied to output terminal 3 by an amount (H+mT), i.e. by mT along the horizontal scanning direction and by 1 H along the vertical scanning direction. In this example it is assumed that the processing delay in the motion detection circuit 22 is (H+mT), so that the time-advancement of the output signal from the subtracter 15 will compensate for that delay. However the amount of time-advancement can be varied to different values as required to compensate for the processing delay in the motion detection circuit 22, by varying the delay amounts of the line delay memory 66 and frame memory 67. For example if these are made respectively (2H+mT) and (522H−mT), then the amount of time-advancement will be 2H+mT, if these are made respectively (3H+mT) and (521H−mT), then the amount of time-advancement will be 3H+mT, and so on. Thus in general the circuit 66 provides a delay of (nH+mT) and memory 67 a delay of (525H−n−1−mT), where n is an integer that is equal to 1 in the embodiment of FIG. 6, assuming 525 scan lines/frame.

Although not shown in FIG. 6, the second embodiment can be modified to enable changeover control whereby the frame memory 68 can be used independently of the noise reduction circuit for a special function of the television receiver, as described for the embodiment of FIG. 2. In that case, the switch 36 of FIG. 2 would be inserted between the frame memories 67, 68, for selectively connecting (under control of the signal applied to input terminal 35 in FIG. 2) the output signal from the frame memory 67 or the externally supplied signal from input terminal 37 (in FIG. 2) to the input of the frame memory 68, and the output of the frame memory 68 would be fixedly connected to the output terminal 38 (in FIG. 2 . In addition, the changeover control circuit 42 and AND gate 34 would be connected to control the color-difference signal noise reduction circuit operation at the times of changeover from use of the memory 68 for the special function to its normal use for noise reduction frame correlation detection.

Although the second embodiment has been described for the case of processing the color-difference signal, it should be apparent that the same principles can be applied to modify the luminance signal processing circuit of FIG. 2, to arrange that the output signal supplied from the subtractor 21 to the motion detection circuit 22 will be time-advanced by an appropriate amount with respect to the noise-reduced luminance signal that is supplied to output terminal 2.

As can be understood from the above description, it is a first feature of the present invention that it can provide a noise reduction apparatus for a composite video signal whereby cross-color components contained in a demodulated color-difference signal or a composite video signal (i.e. interference components which in the case of an NTSC format signal are inverted in phase in successive field intervals) are reduced by the operation of a noise reduction circuit which utilizes recirculation through a single frame memory, whereas control of the degree of noise reduction is executed based on a signal obtained by subtracting the color-difference signal from that signal delayed by 2 frame intervals. Thus, the degree of noise reduction is controlled in accordance with the degree of frame correlation of the color-difference signal (i.e. between each frame and the last frame but one), but is unaffected by the cross-color components contained in the color-difference signal, since these are eliminated from the signal obtained by that subtraction operation. However since the noise reduction circuit acts to attenuate color-difference signal noise components (i.e. which are not sufficiently high in amplitude to be judged as motion components) which are not correlated between each frame and the succeeding frame, the cross-color components are effectively reduced.

It is a second feature of a noise reduction apparatus according to the present invention that when such an apparatus is respectively configured with separate circuits for noise reduction processing of the luminance signal and color-difference signal of a composite video signal, a single noise detection circuit can be used in common for both the luminance signal and color-difference signal noise reduction circuits, to control each circuit such that effective noise reduction will be executed even when the composite video signal is obtained as a received broadcast signal in a region of very low field strength. By using a single noise detection circuit in this way, economy in overall circuit scale is achieved.

It is a third feature of a noise reduction apparatus according to the present invention that although it includes a noise reduction circuit in which two frame memories are utilized in detecting frame correlation, to obtain a difference signal for controlling the degree of noise reduction (e.g. controlling the factor J in FIG. 2), the apparatus can be configured such that one of these memories can be independently used for a separate special function of the television receiver, and such that no interference with the operation of the noise reduction circuit will occur when changeover is executed between use of that memory for the normal noise reduction function and use of the memory for the special function.

It is a fourth feature of a noise reduction apparatus according to the present invention that two 1-frame memories that are used in detecting frame correlation, to obtain a difference signal for controlling the degree of noise reduction of a noise reduction circuit, can also be used in common for deriving a motion detection signal that is required in subsequent motion-adaptive Y/C separation processing.

It is a fifth feature of a noise reduction apparatus according to the present invention that a motion factor value signal that is derived by a circuit having at least some portions in common with a noise reduction circuit can be produced time-advanced with respect to a noise-reduced video signal or color-difference signal that is produced by that noise reduction circuit. The requirement for inserting delay elements into subsequent processing circuits for synchronization of signals that are derived by operating on the noise-reduced video signal or color-difference signal in accordance with the value of the motion factor signal can thereby be reduced.

It has been assumed in the above description that each of the embodiments is a noise reduction apparatus consisting of respectively separate noise reduction circuits for processing each of the luminance signal and the demodulated color-difference signal. However, it would be equally possible to apply the invention to a noise reduction apparatus in which only a single noise reduction circuit is provided, for processing the composite video signal. In that case, for example, the components 16 to 21, 39 and 41 in FIG. 2 would be eliminated, and the digitally-converted input composite video signal from input terminal 1 would be inputted to the subtractor 8 and adder 11, with a noise-reduced video signal being obtained from output terminal 3, and a corresponding motion detection signal from the subtractor 15. In that case, interference components in the input composite video signal resulting from interaction between the chroma signal and high-frequency luminance signal components will be eliminated from the output signals obtained from the subtracter 31 and the subtractor 15, and hence will be attenuated by the noise reduction circuit in the same way as for the cross-color components in the embodiments described above. The output noise-reduced video signal thus produced from output terminal 3 can then be demodulated to obtain the color-difference signal, so that a noise-reduced luminance signal and color-difference signal are obtained, per the described embodiments.

What is claimed is:

1. A noise reduction apparatus for processing an input video signal, comprising:
   operational circuit means coupled to receive said input video signal, and operating on said input video signal to produce a noise-reduced output video signal;
   first 1-frame delay means coupled to receive said noise-reduced output video signal, and to provide a delay of one frame interval said first 1-frame delay means supplying an output signal to said operational circuit means;

second 1-frame delay means coupled to receive said output signal produced from said first 1-frame delay means, and to provide a delay of one frame interval; and gain adjustment means including means for deriving a signal that is a difference between said input video signal and an output signal produced from said second 1-frame delay means, and means for operating on said difference signal to produce a gain adjustment signal for controlling a degree of noise reduction executed by said operational circuit means.

2. A noise reduction apparatus according to claim 1, further comprising:

a first input terminal coupled to receive an externally produced changeover control signal;

changeover gate means controllable for selectively enabling and inhibiting transfer of said gain adjustment signal to said operational circuit means in accordance with said changeover control signal being in a first and a second state, respectively, said operational circuit means being configured to be inoperative when transfer of said gain adjustment signal is inhibited:

a second input terminal and an output terminal respectively coupled to an external circuit, said output terminal being coupled to an output terminal of said second 1-frame delay means; and changeover switch means coupled between said first and second 1-frame delay means, responsive to said changeover control signal for connecting said output signal from said first 1-frame delay means to the input of said second 1-frame delay means when said changeover control signal is at said first state, and for connecting said second input terminal to said input of said second 1-frame delay means when said changeover control signal is at said second state.

3. A noise reduction apparatus according to claim 2, further comprising changeover control circuit means for transferring said changeover control signal to said changeover gate means, and for operating on said changeover control signal to prevent interference with operation of said operational circuit means during changes in state of said control signal.

4. A noise reduction apparatus according to claim 3, in which said changeover control circuit means functions to delay transfer of said changeover control signal to said changeover gate means, by a predetermined time interval, when said changeover control signal returns from said second state to said first state, to thereby delay resumption of operation of said operation circuit means.

5. A noise reduction apparatus for processing an input composite video signal, comprising:

first 1-frame delay means coupled to receive said input composite video signal, and to provide a delay equal to one frame interval of said input composite video signal;

noise detection circuit means for comparing input and output signals of said first 1-frame delay means to detect a level of noise contained in said input composite video signal, and for producing an output signal indicative of said noise level;

demodulation circuit means for deriving an input color-difference signal from said input composite video signal;

operational circuit means coupled to receive said input color-difference signal, said operational circuit means operating on said input color-difference signal to produce a noise-reduced color-difference signal;

second 1-frame delay means for providing a delay of the frame interval said second 1-frame delay means coupled to receive said noise-reduced color-difference signal and to supply an output signal to said operational circuit means;

third 1-frame delay means for providing a delay of one frame interval, said third 1-frame delay means coupled to receive such output signal produced from said second 1-frame delay means;

gain adjustment means including means for deriving a signal that is a difference between said input color-difference signal and an output signal produced from said third 1-frame delay means, and means for operating on said difference signal to produce a gain adjustment signal for controlling a degree of noise reduction executed by said operational circuit means, wherein said degree of noise reduction is reduced to zero when said difference signal increase s in value above a predetermined threshold value, and wherein said degree of noise reduction is increased in accordance with the amount of reduction of said difference signal value below said threshold value; and circuit means coupled to receive said noise detection circuit output signal, said circuit means modifying said gain adjustment signal in accordance with a value of said output signal outputted by said noise detection circuit means.

6. A noise reduction apparatus according to claim 5, in which said circuit means for modifying the gain adjustment signal increases said degree of noise reduction when said detected noise level is above a predetermined value.

7. A noise reduction apparatus according to claim 5, in which said noise detection circuit means comprises means for detecting a level of noise in said composite video signal during each vertical flyback interval to obtain a value of signal-to-noise ratio of said video signal.

8. A noise reduction and motion detection apparatus for processing an input composite video signal, comprising:

first operational circuit means for operating on said input composite video signal to produce a noise-reduced luminance signal;

first 1-frame delay means coupled to receive said noise-reduced luminance signal as an input signal, said first 1-frame delay means producing a delay equal to one frame interval and supplying an output signal to said first operational circuit means;

first gain adjustment circuit means including means for deriving a signal that is a difference between said input composite video signal and said output signal produced from said first 1-frame delay means, and means for operating on said difference signal to produce a gain adjustment signal for controlling a degree of noise reduction executed by said first operational circuit means;

a first subtractor for deriving a first motion detection signal as a difference between said output signal from said first 1-frame delay means and said noise-reduced luminance signal;

demodulation circuit means for deriving an input color-difference signal from said input composite video signal;

second operational circuit means coupled to receive said input color-different signal, and operating on said input color difference signal to produce a noise-reduced color-difference signal;

second 1-frame delay means coupled to receive said noise-reduced color-difference signal to provide a delay of one frame interval and to supply an output signal to be operated on by said second operational circuit means;

third 1-frame delay means coupled to receive an output signal produced from said second 1-frame delay means, and to provide a delay of one frame interval;

second gain adjustment means including means for deriving a signal that is a difference between said input color-difference signal and an output signal produced from said third 1-frame delay means, and means for operating on said difference signal to produce a gain adjustment signal for controlling a degree of noise reduction executed by said second operational circuit means;

a second subtractor for deriving a second motion detection signal as a difference between said output signal from said third 1-frame delay means and said noise-reduced color-difference signal; and motion detection circuit means for operating on said first motion detection signal and second motion detection signal to derive a value of a motion factor.

9. An apparatus according to claim 8, wherein said input color-difference signal is a digital signal in which successive values are synchronized with a basic clock signal having a fixed period (T) and wherein circuits operating on said color-difference signal are synchronized with said clock signal, and wherein said second operation circuit means has a processing delay time of mT, where m is an integer, wherein said second 1-frame delay means is formed of a first delay element coupled to receive said noise-reduced color-difference signal from said second operation circuit means and having a delay time of (H−mt) where H denotes a horizontal scanning period of said composite video signal, a second delay element coupled to receive an output signal from said first delay element and having a delay of (nH+mT) where n is an integer, and a third delay element having a delay of {(k−(n+1)H−mT)} where k is the number of horizontal scan lines per frame of said input composite video signal, the apparatus further comprising a fourth delay element having a delay of H and coupled to receive an output signal produced from said third 1-frame delay means;

wherein a delayed noise-reduced color-difference signal is outputted from said second delay element to be supplied to an external circuit together with said motion factor, and further wherein said second subtracter is coupled to obtain said second motion detection signal as a difference between said output signal from said first delay element and an output signal produced from said fourth delay element, for thereby obtaining said second motion detection signal as a signal that is time-advanced with respect to said delay noise-reduced color-difference signal by a predetermined amount in accordance with said value n.

10. An apparatus according to claim 8, further comprising:

a first input terminal coupled to receive an externally produced changeover control signal;

changeover gate means controllable for selectively enabling and inhibiting transfer of said gain adjustment signal to said second operational circuit means in accordance with said changeover control signal being in a first and a second state, respectively;

a second input terminal and an output terminal, respectively coupled to an external circuit, said output terminal being coupled to receive said output signal of said third 1-frame delay means; and changeover switch means coupled between said second and third 1-frame delay means, responsive to said changeover control signal, for connecting said output signal from said second 1-frame delay means to the input of said third 1-frame delay means when said changeover control signal is at said first state, and for connecting a second input terminal to said input of said third 1-frame delay means when said changeover control signal is at said second state.

11. An apparatus according to claim 10, further comprising changeover control circuit means for transferring said changeover control signal to said changeover gate means, and for operating on said changeover control signal to prevent interference with operation of said second operational circuit means during changes in state of said control signal.

12. A noise reduction and motion detection apparatus processing an input composite video signal, comprising:

first 1-frame delay means providing a delay equal to one frame interval of said input composite video signal;

first operational circuit means for operating on said input composite video signal to produce a noise-reduced luminance signal and for inputting said noise-reduced luminance signal to said first 1-frame delay means, said first operational circuit means including means for deriving a difference signal as a difference between said input composite video signal and an output signal from said first 1-frame delay means;

first gain adjustment circuit means including said means for deriving a difference signal, and means for operating on said difference signal to produce a first gain adjustment signal for controlling a degree of noise reduction executed by said first operational circuit means;

noise detection circuit means for comparing input and output signals of said first 1-frame delay means to detect a level of noise contained in said input composite video signal and produce an output signal indicative of said noise level;

circuit means, coupled to receive said noise detection circuit output signal, for modifying said first gain adjustment signal in accordance with a value of said noise detection circuit output signal;

a first subtracter for deriving a first motion detection signal as a difference between said output signal from said first 1-frame delay means and said noise-reduced luminance signal;

demodulation circuit means for deriving an input color-difference signal from said input composite video signal;

second operational circuit means, coupled to receive said input color-difference signal, for operating on said input color-difference signal to produce a noise-reduced color-difference signal;

second 1-frame delay means, coupled to receive said noise-reduced color-difference signal, for providing a delay of one frame interval;

third 1-frame delay means, coupled to receive an output signal produced from said second 1-frame delay means, for providing a delay of one frame interval;

second gain adjustment means including means for deriving a signal that is a difference between said input color-difference signal and an output signal produced from said third 1-frame delay means, and means for operating on said difference signal to produce a second gain adjustment signal for controlling a degree of noise reduction executed by said second operational circuit means;

circuit means coupled to receive said noise detection circuit output signal for modifying said second gain adjustment signal in accordance with a value of said noise detection circuit output signal;

a second subtracter for deriving a second motion detection signal as a difference between said output signal from said third 1-frame delay means and said noise-reduced color-difference signal; and motion detection circuit means for operating on said first motion detection signal and said second motion detection signal to derive a value of a motion factor.

13. A noise reduction apparatus according to claim 12, in which said circuit means for modifying the second gain adjustment signal increases said degree of noise reduction of said second operational circuit means when said detected noise level is above a predetermined value.

14. A noise reduction apparatus according to claim 12, in which said noise detection circuit means comprises means for detecting a level of noise in said composite video signal during each vertical flyback interval.

* * * * *